United States Patent
Neuberth et al.

(10) Patent No.: US 10,012,275 B2
(45) Date of Patent: Jul. 3, 2018

(54) METHOD FOR CONFIGURING A SOFTWARE DAMPER OF A CLUTCH CONTROL SYSTEM AND SOFTWARE DAMPER FOR DAMPING CHATTER VIBRATIONS

(71) Applicant: Schaeffler Technologies AG & Co. KG, Herzogenaurach (DE)

(72) Inventors: Ulrich Neuberth, Otigheim (DE); Florian Eppler, Karlsruhe (DE); Daniel Muller, Oberkirch (DE); Michael Reuschel, Ottersweier (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/300,475

(22) PCT Filed: Mar. 26, 2015

(86) PCT No.: PCT/DE2015/200195
§ 371 (c)(1),
(2) Date: Sep. 29, 2016

(87) PCT Pub. No.: WO2015/158342
PCT Pub. Date: Oct. 22, 2015

(65) Prior Publication Data
US 2017/0108061 A1 Apr. 20, 2017

(30) Foreign Application Priority Data

Apr. 16, 2014 (DE) .......................... 10 2014 207 310
Apr. 16, 2014 (DE) .......................... 10 2014 207 354
(Continued)

(51) Int. Cl.
*F16D 48/06* (2006.01)

(52) U.S. Cl.
CPC ...... *F16D 48/06* (2013.01); *F16D 2500/1045* (2013.01); *F16D 2500/10412* (2013.01);
(Continued)

(58) Field of Classification Search
CPC .......... F16D 48/06; F16D 2500/50287; F16D 2500/3127; F16D 2500/3107;
(Continued)

(56) References Cited

U.S. PATENT DOCUMENTS

| | | |
|---|---|---|
| 5,293,316 A | 3/1994 | Slicker |
| 5,403,249 A | 4/1995 | Slicker |

(Continued)

FOREIGN PATENT DOCUMENTS

| | | |
|---|---|---|
| CN | 1072890 A | 6/1993 |
| CN | 1108188 A | 9/1995 |

(Continued)

*Primary Examiner* — David J Hlavka
(74) *Attorney, Agent, or Firm* — Volpe and Koenig, P.C.

(57) ABSTRACT

The invention relates to a software damper and to a method for configuring a software damper connected to a clutch control system for damping chatter vibrations of a clutch torque being transferred by means of an automated friction clutch positioned between a combustion engine and a transmission and controlled by the clutch control system, wherein a transmission input speed (r(g)) is captured at the output of the friction clutch by means of the software damper, and the target clutch torque (m(k)) encumbered by chatter vibrations is corrected by means of negative feedback. To design the software damper, a transfer behavior is ascertained over a control link of the clutch control system while the target clutch torque is excited in a frequency range which is relevant for chatter vibrations, under this transfer behavior an undamped first frequency response of the transmission input speed (r(g)) and a second frequency response at the output of the software damper are ascertained, and the
(Continued)

negative feedback of the software damper is determined by comparing the two frequency responses.

8 Claims, 2 Drawing Sheets

(30) Foreign Application Priority Data

| | | |
|---|---|---|
| Apr. 16, 2014 | (DE) | 10 2014 207 361 |
| Apr. 25, 2014 | (DE) | 10 2014 207 833 |
| Jul. 15, 2014 | (DE) | 10 2014 213 703 |
| Jul. 17, 2014 | (DE) | 10 2014 213 925 |
| Jul. 17, 2014 | (DE) | 10 2014 213 927 |
| Jul. 22, 2014 | (DE) | 10 2014 214 196 |

(52) U.S. Cl.
CPC .. *F16D 2500/304* (2013.01); *F16D 2500/306* (2013.01); *F16D 2500/308* (2013.01); *F16D 2500/30426* (2013.01); *F16D 2500/30806* (2013.01); *F16D 2500/30816* (2013.01); *F16D 2500/3107* (2013.01); *F16D 2500/3125* (2013.01); *F16D 2500/3127* (2013.01); *F16D 2500/3163* (2013.01); *F16D 2500/3168* (2013.01); *F16D 2500/50287* (2013.01); *F16D 2500/50293* (2013.01); *F16D 2500/708* (2013.01); *F16D 2500/7044* (2013.01); *F16D 2500/7061* (2013.01); *F16D 2500/7082* (2013.01); *F16D 2500/70605* (2013.01); *F16D 2500/70668* (2013.01); *F16D 2500/70673* (2013.01); *F16D 2500/7109* (2013.01)

(58) Field of Classification Search
CPC . F16D 2500/30426; F16D 2500/10412; F16D 2500/306; F16D 2500/7082; F16D 2500/708; F16D 2500/70673; F16D 2500/70668; F16D 2500/7044; F16D 2500/70605; F16D 2500/7061; F16D 2500/7109; F16D 2500/3168; F16D 2500/3163; F16D 2500/3125; F16D 2500/30816; F16D 2500/30806; F16D 2500/308; F16D 2500/304; F16D 2500/1045; F16D 2500/50293
See application file for complete search history.

(56) References Cited

U.S. PATENT DOCUMENTS

| | | | |
|---|---|---|---|
| 5,630,773 A | | 5/1997 | Slicker et al. |
| 9,518,624 B2 * | | 12/2016 | Neuberth ............... F16D 48/06 |
| 2005/0187068 A1 * | | 8/2005 | Kim ..................... F16D 48/064 |
| | | | 477/70 |
| 2014/0142824 A1 * | | 5/2014 | Kim ....................... F16D 48/06 |
| | | | 701/68 |
| 2015/0060230 A1 | | 3/2015 | Neuberth et al. |
| 2017/0089412 A1 * | | 3/2017 | Oshiumi ................. F16D 48/06 |
| 2017/0159747 A1 * | | 6/2017 | Nakashima ............ F16D 48/06 |

FOREIGN PATENT DOCUMENTS

| | | |
|---|---|---|
| CN | 1165099 A | 11/1997 |
| DE | 102006014072 | 10/2007 |
| DE | 102013204698 | 10/2013 |
| WO | 03100279 | 12/2003 |

* cited by examiner

METHOD FOR CONFIGURING A SOFTWARE DAMPER OF A CLUTCH CONTROL SYSTEM AND SOFTWARE DAMPER FOR DAMPING CHATTER VIBRATIONS

BACKGROUND

The invention relates to a software damper and to a method for configuring a software damper connected to a clutch control system for damping chatter vibrations of a clutch torque being transferred by means of an automated friction clutch positioned between a combustion engine and a transmission and controlled by the clutch control system, wherein a transmission input speed is captured at the output of the friction clutch by means of the software damper, and the target clutch torque encumbered by chatter vibrations is corrected by means of negative feedback.

Automated friction clutches, for example friction clutches combined into a dual clutch, are sufficiently well known and are inserted into drivetrains having a combustion engine and a transmission, for example an automated shift transmission, dual-clutch transmission or the like, between the combustion engine and the transmission. In such cases, the friction clutch is operated by means of a clutch positioner as well as a clutch actuator. The clutch actuator is controlled by a clutch control system. The clutch control system contains a regulator that operates the friction clutch on the basis of a target clutch torque which can be obtained by means of a driving strategy program depending, for example, on a driver's desired torque, driving situations, road conditions and the like, in such a way that a specified clutch torque is present at its output.

Because of the properties of the friction clutch, the transmission and the like, chatter processes may occur at the friction clutch which result in a vibration-accompanied transfer of the target clutch torque with a fixed frequency response in a frequency range up to 30 Hz, for example.

In order to damp this frequency response, a method for reducing chatter vibrations is known from DE 10 2013 204 698 A1, in which an emulated vibration absorber, i.e., a software-based vibration absorber, is superimposed on the clutch positioner for the target clutch torque as a software damper.

SUMMARY

The object of the invention is to propose beneficial refinement of a software damper and a method for configuring it.

The object is fulfilled by the features of the invention. The claims subordinate thereto describe advantageous embodiments of the subject matter.

The proposed method is of use for configuring a software damper connected to a clutch control system to damp chatter vibrations of a clutch torque being transferred by means of an automated friction clutch positioned between a combustion engine and a transmission, controlled by the clutch control system. A transmission input speed is registered at the output of the friction clutch by means of the software damper, and by means of negative feedback the clutch torque exhibiting chatter vibrations is damped at the output of the friction clutch by the target clutch torque being corrected accordingly. To this end, it is proposed that the software damper be designed in a robust manner; i.e., that its control parameters be set by ascertaining a transfer behavior over the control link of the clutch control system when the target clutch torque is excited in a frequency range that is relevant for chatter vibrations, for example at frequencies up to 30 Hz. During this transfer behavior, an undamped first frequency response of the transmission input speed and a second frequency response at the output of the software damper are ascertained. By comparing the two frequency responses, the negative feedback of the software damper, that is, its control parameters, are determined, and the software damper is configured using these.

According to an advantageous embodiment, the two frequency responses are depicted as complex functions with an amplitude and a phase to determine the feedback, and the feedback is calculated mathematically from these. For example, the first undamped frequency response may be depicted as a complex function $X(f)$ and the second frequency response as a complex function $Y(f)$, and the feedback calculated from their relationship $X(f)/(1+X(f)\times Y(f))$. In this case, a maximum of one chatter vibration can be damped at a specified chatter frequency, while flanks of the maximum are raised. This results in a smoothing of the frequency response with moderate intensifications of the feedback.

The proposed software damper is of use for carrying out the described method, and has a filter which, from a transmission input speed with a frequency response subject to chatter vibrations, inputs a negative feedback onto the target clutch torque which damps the chatter vibrations. The linear filter may be designed as a recursive IIR filter (infinite impulse response filter) or as an FIR filter (finite impulse response filter).

According to a preferred embodiment, an intensification of the software damper, i.e., a quantity of the feedback, is set so that it can be shut off. For example, this software damper may be shut off when there is little likelihood of chatter vibrations occurring, and turned on when their likelihood increases, for example when starting to drive the vehicle, creeping, engaging the clutch after gear changes and the like. Areas of transition may be provided between the shut-off and turned-on conditions. For example, regulation of the intensification may be provided by means of a characteristic which depends on stability of the software damper.

Furthermore, a maximum intensification of the feedback can be limited. For example, an intensification may be limited to 150% of an amplitude of the frequency response of the transmission input speed.

In other words, the objects may be fulfilled by a method and an object.

Using knowledge of the frequency response of an approximately linear system such as a clutch system having a clutch positioner, the clutch control system which controls the latter and the drivetrain coupled to the clutch output and transmission input with a load applied, as well as their dynamics, when a linear regulator such as a software damper is utilized, the damped frequency response can be calculated when the regulator is activated. The regulator can thus be designed optimally for a defined target frequency response in the sense of a best fit. Besides step-by-step non-automated designing "by hand," it is also possible for this designing of the target frequency response to be automated by appropriate optimization algorithms. In an alternative design by means of feedback through an FIR filter, this can be calculated especially simply and without employing recursive fit algorithms.

When transitioning to operating ranges in which stable design of the regulator is no longer possible, the latter is deactivated in an advantageous manner. A deactivation may be carried out continuously by means of a withdrawal of the overall intensification of the regulator, since as the intensification is reduced the regulation becomes increasingly "more stable" and approaches the unregulated clutch system. But if the regulation ever does become unstable, the regulator output can be limited by means of a characteristic curve.

When the transfer behavior of a modulated target torque to a measured transmission input speed at an operating point of a drivetrain is known in the form of a frequency response, for example by means of an amplitude response and phase response over excitation frequency, assuming that the behavior is linear an effective damped frequency response can be calculated if the regulator utilized for damping is likewise of linear design. In this case, this linearity represents an approximated property of real clutch systems, which as a rule are not strictly linear. If the undamped system is defined by the complex frequency response X(f) and the negative feedback by the complex frequency response Y(f), then the frequency response with the regulator active can be calculated by the complex function X(f)/(1+X(f)*Y(f)). The design of the software damper can be carried out or evaluated on the basis of the calculated frequency response. Besides a reduction of the amplitude of the frequency response in the range of the resonance, in this case a relative increase of the amplitude outside of the resonance is provided. To achieve a robust design, a frequency response with the flattest possible course is provided, without producing excessively great intensifications, which may result in instability of the regulator.

Since an optimal design "by hand" is difficult, in particular in the case of complex transfer behavior, with defined design criteria an automated design can be carried out. A design criterion may be, for example, to provide the maximum of the amplitude of the damped frequency response as small as possible, and at the same time to keep the maximum intensification smaller than 150%. In this case, the design can be determined by means of usual optimization algorithms.

Especially well suited for an automated design in this case is a design of the regulator or filter in which a linear filter is provided by a so-called FIR filter. Here, the design of the regulator in the form of the software damper can be calculated directly on the basis of a target frequency response for example without the use of recursive fit algorithms. With an FIR filter, a weighted summation of a limited number of past measured values of the transmission input speed or of the target clutch torque, for example stored in a buffer, takes place. A particular challenge here is to take account of the fact that no values "from the future" may be used. So as to nevertheless achieve a reliable design, the following boundary conditions may be provided. A maximum intensification, a maximum amplitude, a sampling interval and a buffer time and the like dependent on the filter order may be specified.

According to an advantageous embodiment, controlled shut-off of the regulator when transitioning into operating modes in which a stable regulator design is no longer possible may be provided. The shut-off can take place continuously by means of an overall intensification. As the intensification is reduced, the actuation of the regulator becomes increasingly "more stable" and approaches the unregulated clutch system.

If the regulation becomes unstable in an operating range of the motor vehicle or of the drivetrain, for example due to unforeseeable changes of operating parameters, an appropriate correction of the regulator takes place by limiting the regulator output and thus the negative consequences. This may occur, for example, by means of a characteristic curve stored in the clutch control system, which has the unlimited regulator output signal as input and a limited regulator output signal as output. For small signals, this has a slope of 1, and it becomes flatter or has a slope of zero for larger signals.

BRIEF DESCRIPTION OF THE DRAWINGS

The invention will be explained in further detail on the basis of the exemplary embodiment depicted in FIGS. 1 through 3. The figures show the following.

DETAILED DESCRIPTION OF THE PREFERRED EMBODIMENTS

Figure 1:
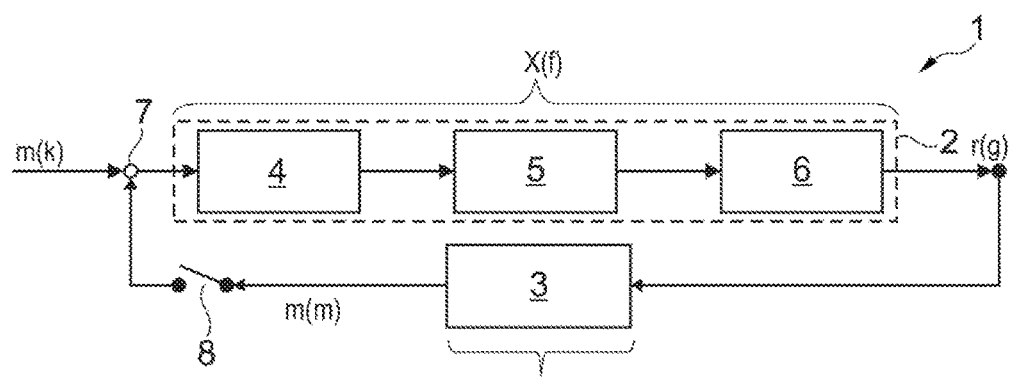
FIG. 1 a block diagram of a software damper.

FIG. 1 shows the block diagram 1 with the sequence of a method for damping chatter vibrations along the control link 2 by means of the software damper 3. The associated friction clutch is regulated by a clutch positioner and a clutch control system by means of a control algorithm to a specified target clutch torque m(k) which is dependent on a driving situation, for example by means of a position controller. In certain operating situations, for example when starting to drive the vehicle, creeping, engaging the clutch after gear changes and the like, a chattering of the friction clutch may occur, which depends on the disturbance variables 4, 5, 6, along the control link 2, for example the software of the clutch control system, the clutch and clutch positioner dynamics and the drivetrain dynamics. The software damper 3 picks up the transmission input signal r(g) at the output of the friction clutch and produces, in a state matched to the disturbance variables 4, 5, 6, the modulation torque m(m) as negative feedback to the chatter vibrations, and with it corrects the target clutch torque m(k) at the connection point 7. The corrected target clutch torque m(k) influences the clutch torque being transferred at the friction clutch by means of the clutch positioner, and uses it to compensate for the chatter vibrations. Between the connection point 7 and the software damper 3 the switch 8 is provided, which weights the effect of the software damper 3 digitally or according to a specified characteristic curve. The switch may shut off the software damper or reduce its effect, for example when the software damper 3 is unstable, in operating states in which chatter vibrations do not occur, for example at rotational speeds which are elevated in comparison to a specified speed threshold or when there are differences between the input and output speeds of the friction clutch and the like. Furthermore, an intensification of the software damper 3 can be set by means of the switch 8.

The software damper 3 is configured independent of the disturbance variables 4, 5, 6. To this end, the transfer behavior over the control link 2 is ascertained over the control link 2, for example empirically on the vehicle, by means of model calculations or the like. Next, the target clutch torque m(k) is subjected to prescribed vibrations, vibration patterns or the like, which fall in the range of the frequency/frequencies of a chatter process at the friction clutch. Depending on various operating situations of the vehicle or of the drivetrain, the frequency responses of the control link 2 and of the software damper 3 are registered as complex functions X(f) and Y(f) under the assumption of a linear control link 2 and a linear software damper 3. The software damper is designed, that is, its parameterization is determined, from the correlation $X(f)/(1+X(f) \times Y(f))$.

Figure 2:
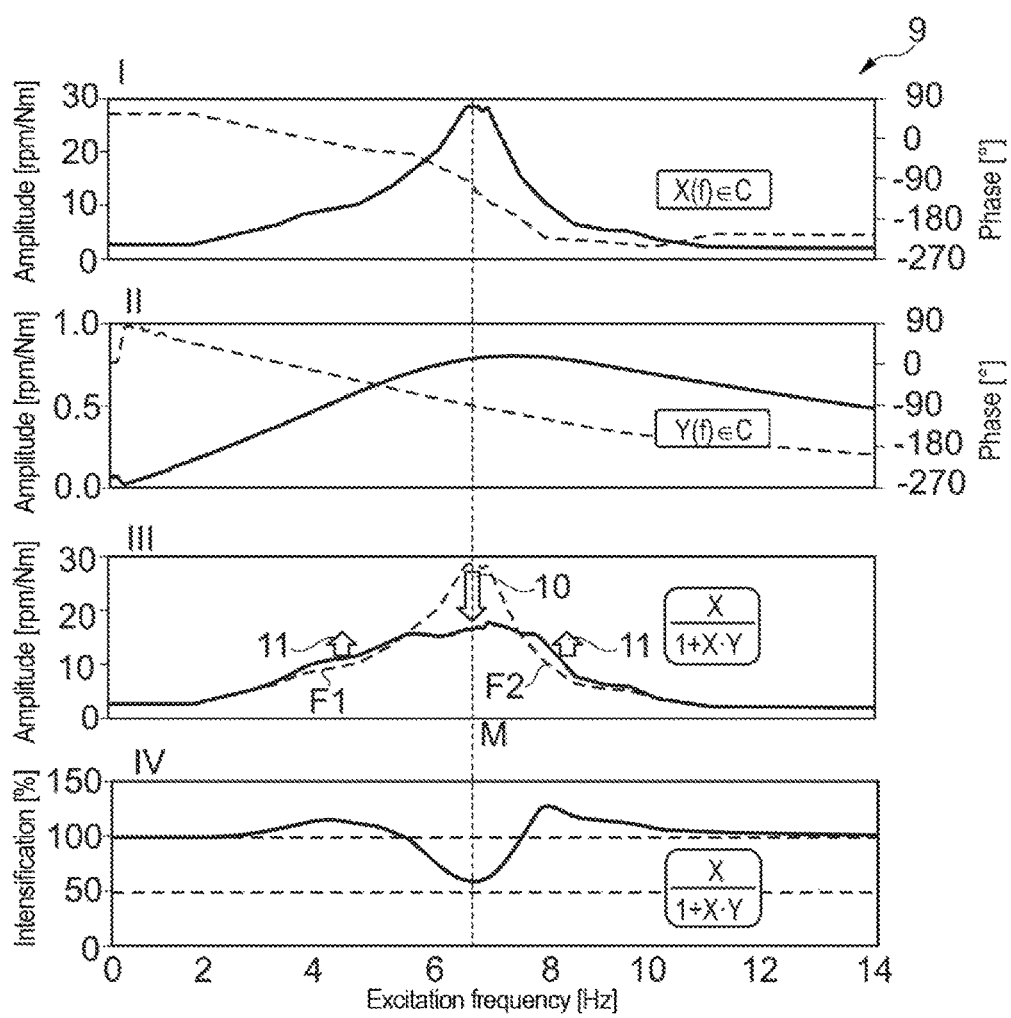
FIG. 2 a diagram depicting a design of a software damper.

FIG. 2 shows the diagram 9 with the sub-diagrams I, II, III, IV of the excitation frequency in a typical frequency range between 0 and 14 Hz. Sub-diagram I shows by a solid line the amplitude and by a dashed line the phase of the frequency response of the complex function $X(f)$ over the control link 2 of FIG. 1. Sub-diagram II shows the frequency response ascertained therefrom, with the complex function $Y(f)$. Sub-diagram III shows the amplitudes of the transfer function with the active, designed software damper 3 (FIG. 1) by a solid line compared to the uncompensated frequency response depicted by a dashed line with the complex function $X(f)$ of sub-diagram I. This makes it clear that for a robust design of the software damper 3 the maximum M is reduced only incompletely in the direction of the arrow 10, and the flanks F1, F2 are raised in the direction of the arrows 11. Sub-diagram IV shows the intensification of the software damper 3 designed according to sub-diagrams I-III over the excitation frequency. In this case, the maximum intensification may be limited to 150% for example.

Figure 3:
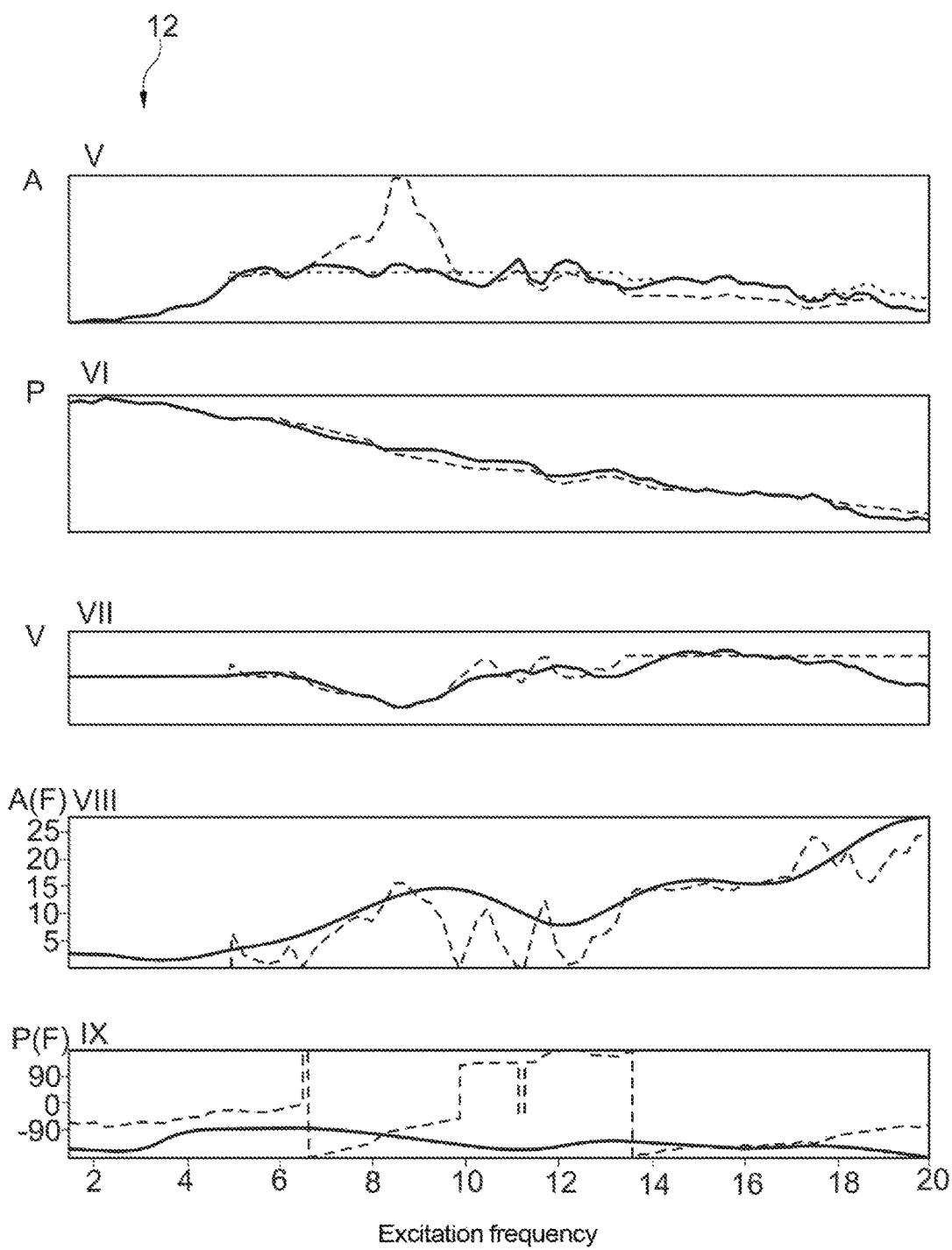
FIG. 3 a diagram for automatic configuration of a software damper having an FIR filter.

FIG. 3 shows the diagram 12 with the sub-diagrams V, VI, VII, VIII, IX for automated configuration of a software damper having an FIR filter. Sub-diagram V represents the frequency response of the transmission input speed by a dashed line. For the design of the FIR filter, the target frequency response specified by a dotted line is specified. The FIR filter is adjusted by means of the actual frequency response and the target frequency response by means of optimization algorithms, so that the frequency response depicted by a solid line results. Sub-diagram VI shows the phase of the actual uncompensated frequency response by a dashed line and the frequency response compensated for by means of the FIR filter by a solid line. Sub-diagram VII shows the intensification V of the FIR filter over the excitation frequency as chatter frequency. The diagram depicts the resulting intensification due to the target frequency response of the sub-diagram V by a dashed line, and the resulting intensification according to the design of the FIR filter by a solid line. Sub-diagram VIII shows a limitation of the filter amplitude $A(F)$ and sub-diagram IX the limitation of the filter phases $\varphi(F)$ through appropriate use of boundary conditions by a bold line, compared to unlimited amplitude and unlimited filter phase, depicted by a thin line.

REFERENCE LABELS 1 block diagram
2 control link
3 software damper
4 disturbance variable
5 disturbance variable
6 disturbance variable
7 connection point
8 switch
9 diagram
10 arrow
11 arrow
12 diagram
A amplitude
A(F) filter amplitude
F1 flank
F2 flank
M maximum
m(k) target clutch torque
m(m) modulation torque
r(g) transmission input speed
V intensification
I sub-diagram
II sub-diagram
III sub-diagram
IV sub-diagram
V sub-diagram
VI sub-diagram
VII sub-diagram
VIII sub-diagram
IX sub-diagram
$\varphi$ phase
$\varphi(F)$ filter phase

The invention claimed is:

1. A method for configuring a software damper connected to a clutch control system to damp chatter vibrations of a clutch torque being transferred by an automated friction clutch positioned between a combustion engine and a transmission, controlled by the clutch control system, the method comprising:
   capturing a transmission input speed (r(g)) at an output of the friction clutch by the software damper, and correcting a target clutch torque (m(k)) encumbered by chatter vibrations by negative feedback, the software damper is configured by ascertaining a transfer behavior when the target clutch torque (m(k)) is excited in a frequency range that is relevant for the chatter vibrations over a control link of the clutch control system, and under said transfer behavior ascertaining an undamped first frequency response of the transmission input speed (r(g)) and a second frequency response at an output of the software damper, and determining the negative feedback of the software damper by comparing the undamped first frequency response and the second frequency response.

2. The method according to claim 1, wherein the undamped first frequency response is depicted as a complex function X(f) and the second frequency response is depicted as a complex functions Y(f), with an amplitude (A) and a phase ($\varphi$) to determine the feedback.

3. The method according to claim 1, wherein a maximum (M) of a chatter vibration is reduced and flanks (F1, F2) of the maximum (M) are raised.

4. A software damper for carrying out the method according to claim 1, further comprising a filter which inputs a modulation torque (m(m)) that damps the chatter vibrations into the target clutch torque (m(k)).

5. The software damper according to claim 4, wherein the software damper is made from a finite impulse response (FIR) filter.

6. The software damper according to claim 4, further comprising setting an intensification (V) of the software damper so that it may be shut off.

7. The software damper according to claim 6, further comprising regulating the intensification (V) by a characteristic curve that depends on a stability of the software damper.

8. The software damper according to claim 4, further comprising limiting a maximum intensification (V) of the feedback to 150% of an amplitude (A) of the frequency response of the transmission input speed (r(g)).

* * * * *